US012400287B2

United States Patent
Chen et al.

(10) Patent No.: US 12,400,287 B2
(45) Date of Patent: Aug. 26, 2025

(54) METHOD, ELECTRONIC DEVICE, AND COMPUTER PROGRAM PRODUCT FOR VIDEO PROCESSING UTILIZING TEMPLATE AND ASSOCIATED IMAGE CONVERSION MODEL

(71) Applicant: Dell Products L.P., Round Rock, TX (US)

(72) Inventors: Qiang Chen, Shanghai (CN); Pedro Fernandez, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 474 days.

(21) Appl. No.: 17/962,581

(22) Filed: Oct. 10, 2022

(65) Prior Publication Data

US 2024/0095878 A1    Mar. 21, 2024

(30) Foreign Application Priority Data

Sep. 16, 2022   (CN) .......................... 202211132092.X (51) Int. Cl.
*G06T 5/00* (2024.01)
*G06T 3/40* (2006.01)
*G06T 5/50* (2006.01)

(52) U.S. Cl.
CPC .................. *G06T 3/40* (2013.01); *G06T 5/50* (2013.01); *G06T 2207/10016* (2013.01); *G06T 2207/20016* (2013.01)

(58) Field of Classification Search
CPC ......... G06T 3/4046; G06T 2207/10016; G06T 3/4053; G06T 2207/20081; G06T 3/4092;
(Continued)

(56) References Cited

U.S. PATENT DOCUMENTS

| 10,701,394 B1 | 6/2020 | Caballero et al. |
| 12,033,301 B2 * | 7/2024 | Liu ........................... G06T 1/20 |

(Continued)

OTHER PUBLICATIONS

Iizuka, Satoshi, and Edgar Simo-Serra. "Deepremaster: temporal source-reference attention networks for comprehensive video enhancement." ACM Transactions on Graphics (TOG) 38.6 (2019): 1-13.*
(Continued)

*Primary Examiner* — Li Liu
(74) *Attorney, Agent, or Firm* — Ryan, Mason & Lewis, LLP (57) ABSTRACT

Embodiments of the present disclosure relate to a method, an electronic device, and a computer program product for video processing. The method includes: converting, based on a sample frame in a first video having a first resolution as well as a template, a first group of image frames in the first video that correspond to the sample frame to a second group of image frames that are more similar to the template. The method also includes: converting the second group of image frames to a third group of image frames having a higher resolution to generate a higher-resolution video. In this manner, low-resolution image frames can be first converted to image frames that are more suitable for resolution conversion, so that a high-resolution video of a higher quality can be obtained when reconstructing the high-resolution video.

20 Claims, 7 Drawing Sheets

(58) Field of Classification Search
CPC ........... G06T 3/40; G06T 7/248; G06V 10/82; G06V 20/46; G06V 10/7715; G06V 10/774; G06V 20/49
See application file for complete search history.

(56) References Cited

U.S. PATENT DOCUMENTS

| | | | |
|---|---|---|---|
| 2013/0169863 A1 | 7/2013 | Smith et al. | |
| 2018/0139458 A1 | 5/2018 | Wang et al. | |
| 2019/0130530 A1 | 5/2019 | Schroers et al. | |
| 2020/0162789 A1 | 5/2020 | Ma et al. | |
| 2021/0006782 A1 | 1/2021 | Ramchandran et al. | |
| 2023/0099034 A1* | 3/2023 | Le ........................ | H04N 19/187 375/240.01 |
| 2024/0005518 A1* | 1/2024 | Bandwar ................. | G06T 7/248 |
| 2024/0020790 A1* | 1/2024 | Gu ........................ | G06T 3/4053 |

OTHER PUBLICATIONS

Lee, Royson, Stylianos I. Venieris, and Nicholas D. Lane. "Deep neural network-based enhancement for image and video streaming systems: A survey and future directions." ACM Computing Surveys (CSUR) 54.8 (2021): 1-30.*

Kauff, Peter, and Oliver Schreer. "An immersive 3D video-conferencing system using shared virtual team user environments." Proceedings of the 4th international conference on Collaborative virtual environments. 2002.*

He, Zhenyi, et al. "Gazechat: Enhancing virtual conferences with gaze-aware 3d photos." The 34th Annual ACM Symposium on User Interface Software and Technology. 2021.*

Wikipedia, "Google Stadia," https://en.wikipedia.org/wiki/Google_Stadia, Aug. 11, 2021, 15 pages.

Wikipedia, "Video Super Resolution," https://en.wikipedia.org/wiki/Video_Super_Resolution, Jun. 27, 2021, 18 pages.

Amazon Web Services, "AI Video Super Resolution," https://www.amazonaws.cn/en/solutions/ai-super-resolution-on-aws/, Feb. 2020, 6 pages.

Wikipedia, "GeForce Now," https://en.wikipedia.org/wiki/GeForce_Now, Jun. 6, 2021, 5 pages.

Wikipedia, "Xbox Cloud Gaming," https://en.wikipedia.org/wiki/Xbox_Cloud_Gaming, Aug. 9, 2021, 7 pages.

C. Faulkner, "Microsoft's xCloud game streaming is now widely available on iOS and PC," https://www.theverge.com/2021/6/28/22554267/microsoft-xcloud-game-streaming-xbox-pass-ios-iphone-ipad-pc, Jun. 28, 2021, 4 pages.

Wikipedia, "Nvidia Shield TV," https://en.wikipedia.org/wiki/Nvidia_Shield_TV, Jun. 24, 2021, 3 pages.

U.S. Appl. No. 17/400,350 filed in the name of Qiang Chen et al. on Aug. 12, 2021, and entitled "Method, Electronic Device, and Computer Program Product for Video Processing."

U.S. Appl. No. 17/400,382 filed in the name of Pedro Fernandez Orellana et al. on Aug. 12, 2021, and entitled "Method, Electronic Device, and Computer Program Product for Image Processing."

U.S. Appl. No. 17/520,908 filed in the name of Qiang Chen et al. on Nov. 8, 2021, and entitled "Method, System, and Computer Program Product for Streaming."

U.S. Appl. No. 17/572,203 filed in the name of Pedro Fernandez Orellana et al. on Jan. 10, 2022, and entitled "Method, Device, and Computer Program Product for Video Processing."

U.S. Appl. No. 17/665,649 filed in the name of Pedro Fernandez Orellana et al. on Feb. 7, 2022, and entitled "Computer-Implemented Method, Device, and Computer Program Product."

U.S. Appl. No. 17/672,369 filed in the name of Qiang Chen et al. on Feb. 15, 2022, and entitled "Method for Generating Metadata, Image Processing Method, Electronic Device, and Program Product."

U.S. Appl. No. 17/857,739 filed in the name of Qiang Chen et al. on Jul. 5, 2022, and entitled "Method, Electronic Device, and Computer Program Product for Video Processing."

* cited by examiner

METHOD, ELECTRONIC DEVICE, AND COMPUTER PROGRAM PRODUCT FOR VIDEO PROCESSING UTILIZING TEMPLATE AND ASSOCIATED IMAGE CONVERSION MODEL

RELATED APPLICATION(S)

The present application claims priority to Chinese Patent Application No. 202211132092.X, filed Sep. 16, 2022, and entitled "Method, Electronic Device, and Computer Program Product for Video Processing," which is incorporated by reference herein in its entirety.

FIELD

Embodiments of the present disclosure relate to the field of video technologies, and more particularly, to a method, an electronic device, and a computer program product for video processing.

BACKGROUND

In recent years, remote offices have become increasingly popular, and have driven the rapid growth of remote video conferencing services. However, due to limitations of an imaging device of a user, or in order to reduce bandwidth pressure on network transmission, a video conferencing service may capture a low-quality video from the user. For example, the user may conduct a video conference outdoors using a low-imaging quality front-facing camera of a portable smartphone. In this case, the low-quality video will bring a poor user experience for attendees participating in the video conference.

SUMMARY

In a first aspect of the present disclosure, a method for video processing is provided. The method includes: converting, based on a sample frame in a first video having a first resolution as well as a template, a first group of image frames in the first video that correspond to the sample frame to a second group of image frames, wherein the similarity between the second group of image frames and the template is higher than that between the first group of image frames and the template. The method also includes: converting the second group of image frames having the first resolution to a third group of image frames having a second resolution, wherein the second resolution is higher than the first resolution. The method also includes: generating a second video having the second resolution based on the third group of image frames.

In a second aspect of the present disclosure, an electronic device is provided. The electronic device includes a processor and a memory coupled to the processor, wherein the memory has instructions stored therein, and the instructions, when executed by the processor, cause the device to execute actions. The actions include: converting, based on a sample frame in a first video having a first resolution as well as a template, a first group of image frames in the first video that correspond to the sample frame to a second group of image frames, wherein the similarity between the second group of image frames and the template is higher than that between the first group of image frames and the template. The actions also include: converting the second group of image frames having the first resolution to a third group of image frames having a second resolution, wherein the second resolution is higher than the first resolution. The actions also include: generating a second video having the second resolution based on the third group of image frames.

In a third aspect of the present disclosure, a computer program product is provided. The computer program product is tangibly stored on a non-transitory computer-readable medium and includes machine-executable instructions that, when executed by a machine, cause the machine to perform the method according to the first aspect.

This Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

By more detailed description of example embodiments of the present disclosure, provided herein with reference to the accompanying drawings, the above and other objectives, features, and advantages of the present disclosure will become more apparent, where identical reference numerals generally represent identical components in the example embodiments of the present disclosure. In the drawings.

DETAILED DESCRIPTION

Principles of the present disclosure will be described below with reference to several example embodiments illustrated in the accompanying drawings. Although the drawings show example embodiments of the present disclosure, it should be understood that these embodiments are merely described to enable those skilled in the art to better understand and further implement the present disclosure, and not to limit the scope of the present disclosure in any way.

As used herein, the term "include" and variations thereof mean open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

It is to be noted that the figures or values used herein are illustrative and should not be construed as a limitation to the present disclosure.

As described above, video conferencing services may capture low-quality videos, which can bring a poor experience for attendees of video conferences. In some examples, users may use devices with poor imaging quality for video conferencing in an outdoor or mobile environment. In other examples, since broadband networks typically provide users with large downlink bandwidth and relatively small uplink bandwidth, video conferencing services may reduce data traffic by reducing the resolution of images captured by cameras, thus prioritizing the meeting of smoothness requirements.

A number of solutions have been proposed for improving the user experience of attendees of video conferences. In these solutions, image conversion models can be used to reconstruct a higher-quality video based on a captured low-quality video to distribute to attendees of a video conference to improve the user experience.

However, due to the flexibility of remote videoconferencing, users may conduct videoconferencing in variable environments, so the captured low-quality video may involve a variety of different environments. In such a case, the environments in the low-quality video may be different from environments in a training dataset used to train an image conversion model, and thus the trained image conversion model may not be suitable for reconstructing a low-quality video in a particular environment. For example, an image conversion model obtained through training using image frames from an indoor conference environment may not be suitable for reconstructing a video captured in an outdoor environment.

In view of this, a solution for video processing is provided in an embodiment of the present disclosure. In this solution, a video processing device converts, based on a sample frame in a first video having a first resolution as well as a template, a first group of image frames in the first video that correspond to the sample frame to a second group of image frames, wherein the similarity between the second group of image frames and the template is higher than that between the first group of image frames and the template. The video processing device converts the second group of image frames having the first resolution to a third group of image frames having a second resolution to generate a second video having the second resolution, wherein the second resolution is higher than the first resolution.

In this manner, by converting low-resolution image frames to image frames that are more suitable for resolution conversion, a high-resolution video of a higher quality can be obtained when reconstructing the high-resolution video.

The basic principles and some example implementations of the present disclosure will be described below with reference to the accompanying drawings. It should be understood that these example embodiments are given only to enable those skilled in the art to better understand and thus implement embodiments of the present disclosure, and are not intended to limit the scope of the present disclosure in any way.

Figure 1:
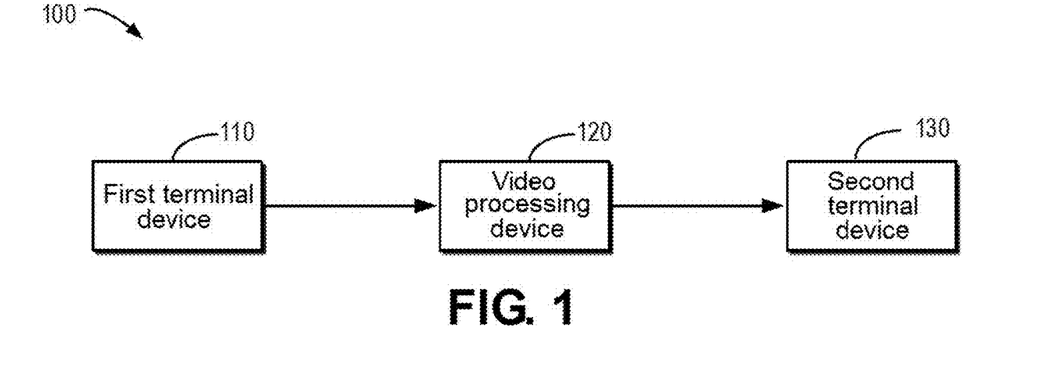
FIG. 1 illustrates a schematic diagram of an example environment in which embodiments of the present disclosure may be implemented.

FIG. 1 illustrates a schematic diagram of example environment 100 in which embodiments of the present disclosure may be implemented. As shown in FIG. 1, environment 100 includes first terminal device 110, video processing device 120, and second terminal device 130 connected over a network. First terminal device 110 and second terminal device 130 may be devices with image acquisition apparatuses, for example, mobile phones, tablet computers, desktop computers, laptop computers, game consoles, and the like. Video processing device 120 may be, for example, a cloud server, a data center, or the like, which may be arranged in a distributed or centralized manner.

Video processing device 120 can provide video transmission services, such as video conferencing, for first terminal device 110 and second terminal device 130. For example, a user (also referred to herein as a "first user" and not shown) of first terminal device 110 and a user (also referred to herein as a "second user" and not shown) of second terminal device 130 can initiate a video conference by enabling an associated application. A video captured by first terminal device 110 using the camera can be sent to video processing device 120. Video processing device 120 processes the video, e.g., reconstructs a low-resolution video into a high-resolution video. Video processing device 120 then transmits the processed video to second terminal device 130. Thus, the second user can see the first user. Similarly, the second user can be seen by the first user. It should be understood that environment 100 may include more terminal devices. In other words, video processing device 120 may provide, for example, video conferencing services for more terminal devices simultaneously, and a video from one terminal device may be transmitted by video processing device 120 to two or more terminal devices.

As shown in FIG. 1, video processing device 120 can acquire a first video of a first resolution from first terminal device 110. The first resolution may be a relatively low resolution, and the term "first resolution" may be used interchangeably with "low resolution" in the following. In some embodiments, first terminal device 110 can capture a low-resolution video. For example, depending on the hardware performance or network conditions of first terminal device 110, first terminal device 110 can capture a video of 480p or 720p. Additionally or alternatively, first terminal device 110 can compress the captured video to a lower-resolution video for transmission to video processing device 120. For example, first terminal device 110 can adjust the resolution of the captured video to ¼ of the original resolution, thereby reducing the demand for upload bandwidth to ¹⁄₁₆ of the original.

Video processing device 120 converts the acquired video of the first resolution to a video of a higher second resolution and sends the converted video to second terminal device 130. The term "second resolution" may be used interchangeably with "high resolution" in the following. Details of the conversion of the first resolution video to the second resolution video will be described below with reference to FIGS. 2 through 6.

Figure 2:
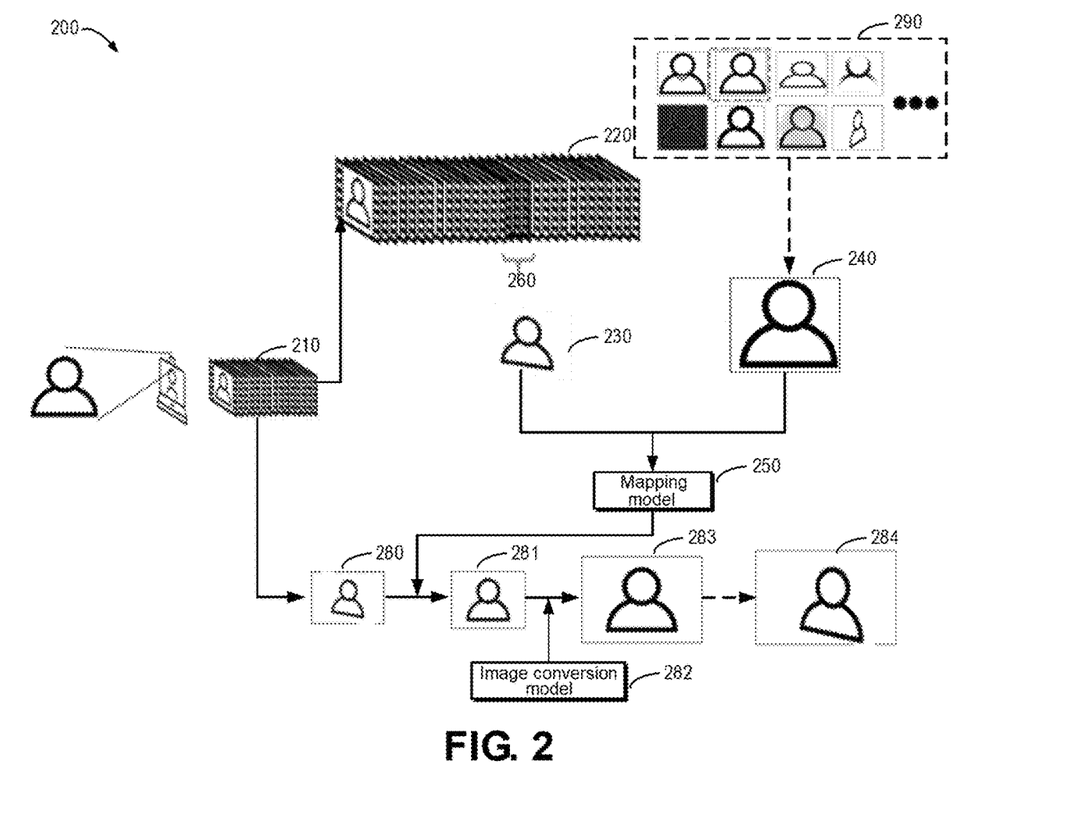
FIG. 2 illustrates a schematic diagram of a process of video processing according to an embodiment of the present disclosure.

FIG. 2 illustrates a schematic diagram 200 of the process of video processing according to an embodiment of the present disclosure. This process may be performed by video processing device 120 in FIG. 1. The process of video processing in FIG. 2 will be described below with reference to FIG. 1.

As shown in FIG. 2, video processing device 120 can acquire video 210 of the first resolution. Video 210 is illustrated as a stream of a plurality of image frames. Video 210 can be generated by an image capture device. For example, the image capture device obtains video 210 by imaging a user.

Video processing device 120 can divide the plurality of image frames in video 210 into at least one group of image frames and process each group of image frames accordingly. For example, video processing device 120 can identify a first group of image frames 220 in video 210 for subsequent processing. The first group of image frames 220 may be at least a part of the plurality of image frames of video 210.

In some embodiments, the plurality of image frames of video 210 can be divided into at least one group of image frames based on characteristics of the image frames. The characteristics of the image frames may include image characteristics, such as the brightness or color distribution. Alternatively or additionally, the characteristics of the image frames may include content characteristics, for example, a scene in an image frame, the posture of an object in the image frame, etc. Examples of the scene may include office scenes, classroom scenes, lawn scenes, etc. Examples of the posture of the object may include a standing posture, a sitting posture, a frontal posture, a side posture, a looking down posture, a looking up posture, etc. Alternatively or additionally, the plurality of image frames of video 210 can be evenly divided into a plurality of successive groups of image frames based on a predetermined number.

Video processing device 120 can determine mapping model 250 based on sample frame 230 in video 210 having the first resolution corresponding to the first group of image frames 220 as well as template 240, to convert the first group of image frames 220 to a second group of image frames (not shown) that are more similar to template 240. In other words, the similarity between the second group of image frames and template 240 is higher than that between the first group of image frames and template 240.

Sample frame 230 corresponding to the first group of image frames 220 may be included in the first group of image frames 220, for example, included in a plurality of sample frames 260. Alternatively, sample frame 230 corresponding to the first group of image frames 220 may be an image frame that precedes the first group of image frames 220 in the time series.

Template 240 may be an image frame with one or more specific characteristics. For example, as shown, template 240 may be a high-brightness image frame including a user in a frontal posture. The similarity between the first group of image frames 220 or the second group of image frames and template 240 may be measured using a variety of suitable metrics. In some embodiments, the metrics may indicate the similarity between the above characteristics of the image frames. Alternatively or additionally, the metrics may indicate the similarity between each pixel value in an image frame. For example, the metric may be mean square error.

Mapping model 250 is configured to convert each image frame in the first group of image frames 220 to a corresponding image frame that is more similar to template 240. In other words, mapping model 250 can convert image frames captured in a real environment to image frames similar to the environment of template 240.

In some embodiments, mapping model 250 may include a mapping function, such as a linear or nonlinear function. For example, by multiplying the brightness of a low-brightness image frame by a correction coefficient, a high-brightness image frame that is more similar to the high-brightness template 240 can be obtained. Alternatively or additionally, mapping model 250 may include a more complex neural network model. For example, mapping model 250 can receive image frames as input and output image frames that are more similar to template 240.

In some embodiments, video processing device 120 can determine mapping model 250 based on a comparison between the characteristics of sample frame 230 and the characteristics of template 240. In an example, a coordinate transformation coefficient may be determined based on the posture of the user in sample frame 230 and the posture of the user in template 240 to serve as at least a part of mapping model 250. In another example, a scaling coefficient for each color channel may be determined based on the color distribution of sample frame 230 and the color distribution of template 240 to serve as at least a part of mapping model 250.

Based on the determined mapping model 250, video processing device 120 converts the first group of image frames 220 to a second group of image frames (not shown) that are more similar to template 240. The process of converting the first group of image frames 220 to the second group of image frames is illustrated in FIG. 2 taking image frame 280 of the first group of image frames 220 as an example. As shown in FIG. 2, video processing device 120 applies mapping model 250 to image frame 280 including the user in a slightly tilted posture to generate image frame 281 including the user in a frontal posture that is more similar to template 240.

Based on the second group of image frames that are more similar to template 240, video processing device 120 converts, using image conversion model 282 associated with template 240, the second group of image frames having the first resolution to a third group of image frames having a higher second resolution to generate a video having the second resolution. Image conversion model 282 is configured to reconstruct a high-resolution image frame based on a low-resolution image frame. For example, as shown in FIG. 2, video processing device 120 may apply image conversion model 282 to image frame 281 to obtain image frame 283 having a higher resolution.

Image conversion model 282 may be any suitable resolution reconstruction model obtained using a training data set associated with template 240, and the scope of the present disclosure is not limited herein. In some embodiments, the training data set associated with template 240 may include training frames of the first resolution and training frames of the second resolution that have similar characteristics to template 240. In this case, since image conversion model 282 is trained based on training frames having similar characteristics to template 240, applying image conversion model 282 to the second group of image frames that are more similar to template 240 can result in a better conversion effect compared with the first group of image frames 220, thereby improving the quality of the reconstructed video.

In some embodiments, video processing device 120 may be deployed with a plurality of templates 290, and each of the templates is associated with a corresponding image conversion model. Each of the plurality of templates 290 may have different characteristics. For example, as shown in FIG. 2, the plurality of templates 290 may include a template with very low brightness, a template including a user in a frontal posture, a template including a user in a side posture, and the like.

Video processing device 120 may select based on sample frame 230 an appropriate template 240 among the plurality of templates 290 for use in determining mapping model 250. Video processing device 120 may select template 240 that is most similar to sample frame 230 based on the similarity between the sample frame and each of the plurality of templates 290. In this manner, the mapping noise introduced when obtaining the second group of image frames using mapping model 250 can be reduced, and consequently the noise in the obtained third group of image frames can be reduced. Furthermore, since the plurality of templates 290 and the corresponding multiple image conversion models can be respectively targeted to different environments, the quality of the reconstructed video can be improved using the selected image conversion model compared with a more pervasive image conversion model.

In some embodiments, video processing device 120 may also utilize a reverse mapping model (not shown) corresponding to mapping model 250 to convert again the obtained third group of image frames to a fourth group of image frames to generate a high-resolution video. In other words, the operations performed using mapping model 250 may be reversible. For example, as shown in FIG. 2, video processing device 120 may apply the reverse mapping model to image frame 283 to obtain image frame 284. In contrast to image frame 283, image frame 284 is restored to a real environment similar to that of image frame 280. In this manner, the obtained high-resolution image frame can be restored to an image frame in a real environment while retaining high resolution, thereby improving the realism of the reconstructed video.

Figure 3:
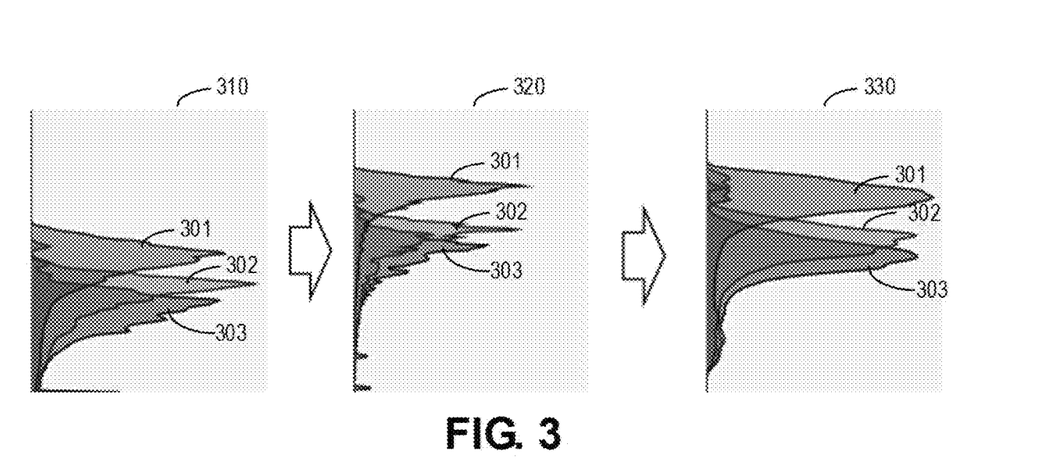
FIG. 3 illustrates a schematic diagram of a process of change of the color distribution of image frames according to an embodiment of the present disclosure.

FIG. 3 illustrates a schematic diagram of the change of the color distribution of image frames according to an embodiment of the present disclosure. FIG. 3 illustrates the distribution of a plurality of colors (e.g., a first color 301, a second color 302, and a third color 303) in an image frame, wherein the vertical coordinate indicates the color value of a color and the horizontal coordinate indicates the number of pixels corresponding to a color value in the image frame. Referring also now to FIG. 2, FIG. 3 illustrates color distribution 310 of a darker, low-resolution image frame 280, color distribution 320 of image frame 281 more similar to the brighter template 240, and color distribution 330 of the reconstructed high-resolution image frame 283 in the real environment. As shown, color distribution 320 of the mapped image frame 281 is shifted to a higher color value due to the greater similarity to the brighter template 240. In addition, color distribution 330 of image frame 283 has a smoother curve due to the higher resolution of image frame 283.

With continued reference to FIG. 2, in some embodiments, if it is determined that the similarity between at least one image frame of the second group of image frames obtained through mapping and template 240 is below a threshold, video processing device 120 may update mapping model 250 based on another sample frame corresponding to the first group of image frames 220 and template 240 for use in updating those image frames with a similarity below the threshold.

Figure 4:
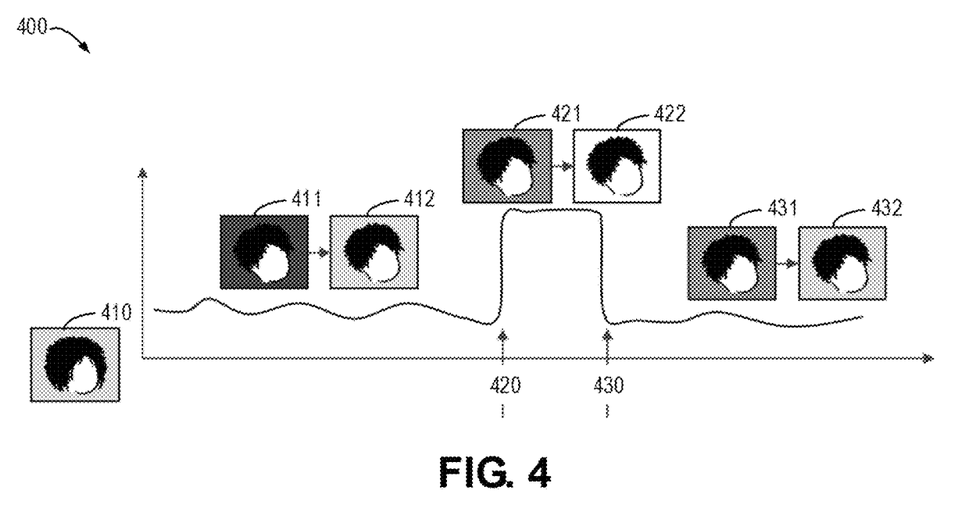
FIG. 4 illustrates a schematic diagram of a process of updating a mapping model according to an embodiment of the present disclosure.

FIG. 4 illustrates a schematic diagram of the process of updating a mapping model according to an embodiment of the present disclosure. In process 400, an initial mapping model can be determined based on the sample frame (not shown) and template 410. By applying an initial mapping model to image frame 411 with low brightness, image frame 412 with similar brightness to template 410 can be obtained. At 420, due to the high brightness of image frame 421, applying the initial mapping model to image frame 421 results in image frame 422 with a higher brightness than template 410. In this case, applying the image conversion model associated with template 410 to image frame 422 with higher brightness than template 410 may cause a reduction in conversion quality. Therefore, at 430, a new mapping model suitable for brighter image frames may be determined based on anew sample frame (e.g., image frame 421) and template 410. Using this new mapping model, image frame 431 with higher brightness may be converted to image frame 432 with similar brightness to template 410 to allow the image conversion model associated with template 410 to be applied to image frame 432. In this manner, the mapping model can be adaptively updated when the real environment changes significantly, thereby improving the quality of the reconstructed video.

Figure 5:
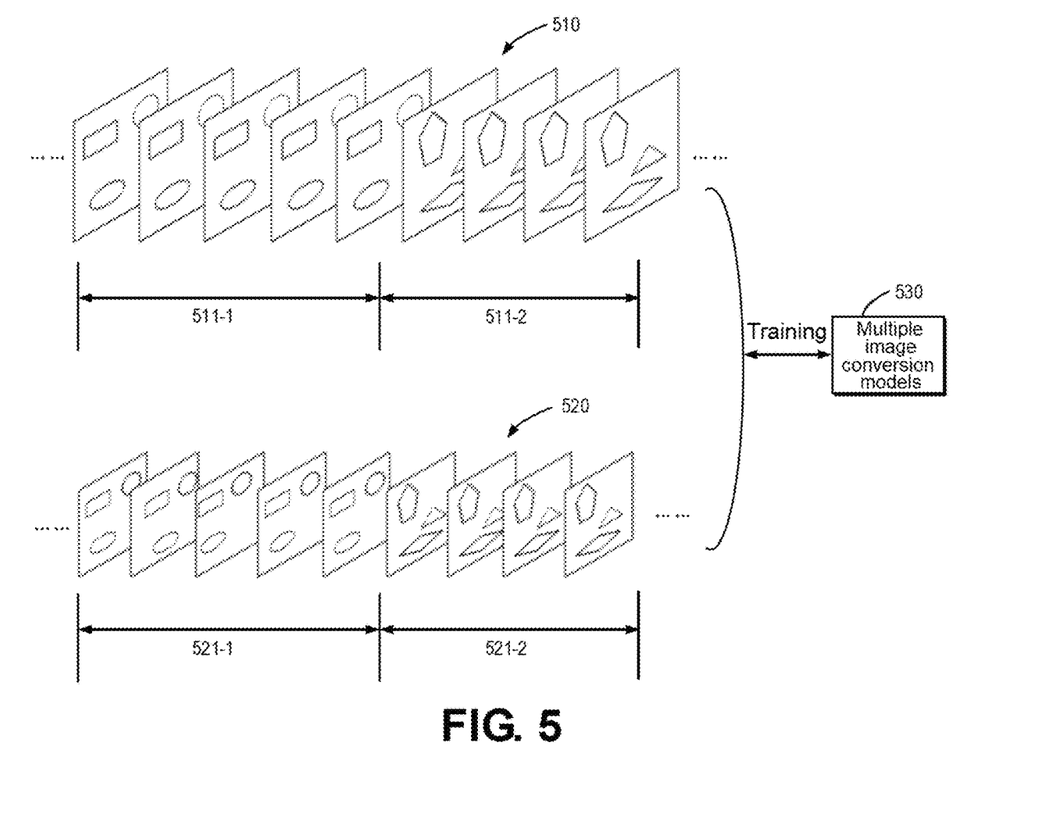
FIG. 5 illustrates a schematic diagram of a training data set for training multiple image conversion models according to some embodiments of the present disclosure.

FIG. 5 illustrates a schematic diagram of a training data set for training multiple image conversion models 530 according to some embodiments of the present disclosure. As described above, each of the multiple image conversion models 530 is trained based on training frames that have similar characteristics to the template. In other words, the training data set includes training frames of the first resolution and training frames of the second resolution that have similar characteristics to the template. As shown, image frame 510 of the first resolution includes a subset of image frames 511-1 for a first scene and a subset of image frames 511-2 for a second scene, and image frame 520 of the second resolution includes a subset of image frames 521-1 for the first scene and a subset of image frames 521-2 for the second scene.

The first image conversion model associated with the template including the first scene can be trained based on the subset of image frames 511-1 of the first resolution and the subset of image frames 521-1 of the second resolution for the first scene. Similarly, the second image conversion model associated with the template including the second scene can be trained based on the subset of image frames 511-2 of the first resolution and the subset of image frames 521-2 of the second resolution for the second scene.

In this manner, the image conversion model associated with the template having a particular characteristic can be trained so that the quality of the high-resolution image frame reconstructed based on the low-resolution image frame having that characteristic can be improved.

Figure 6:
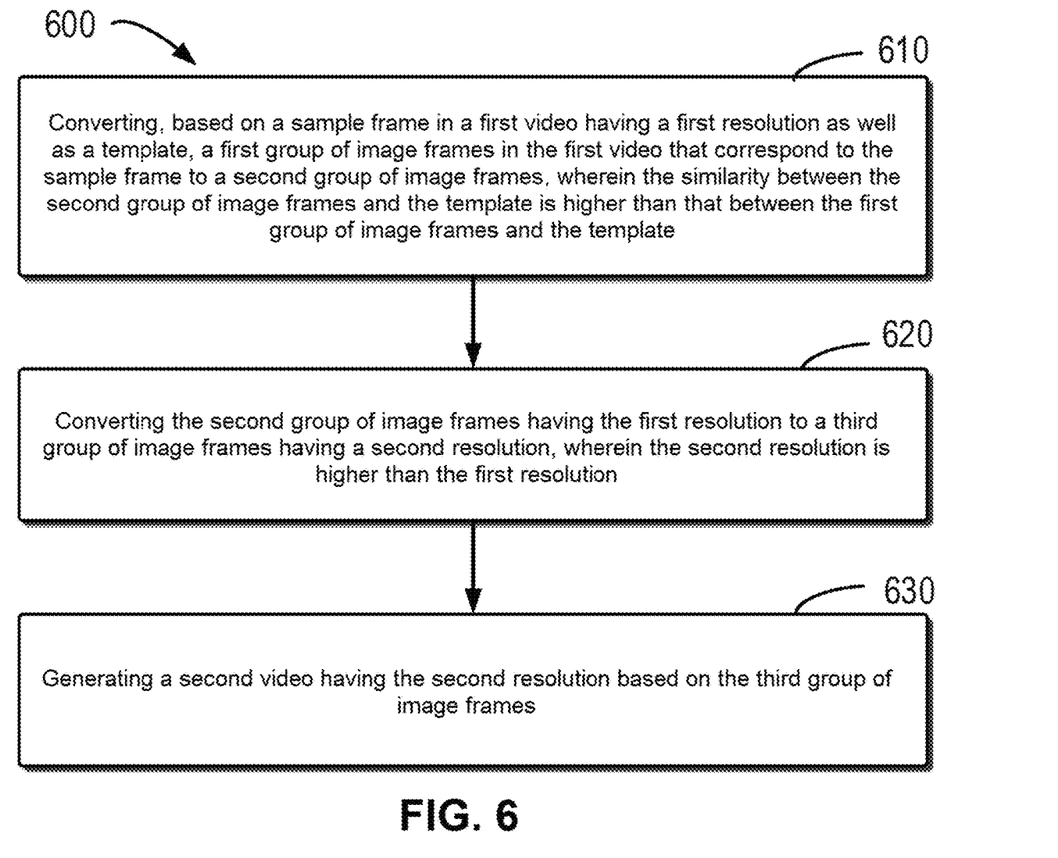
FIG. 6 illustrates a flow chart of a video processing method according to an embodiment of the present disclosure.

FIG. 6 illustrates a flow chart of video processing method 600 according to an embodiment of the present disclosure. Method 600 may be performed, for example, by video processing device 120 as shown in FIG. 1. It should be understood that method 600 may also include additional actions not shown and/or may omit actions shown, and the scope of the present disclosure is not limited in this regard.

At block 610, video processing device 120 converts, based on a sample frame in a first video having a first resolution as well as a template, a first group of image frames in the first video that correspond to the sample frame to a second group of image frames, wherein the similarity between the second group of image frames and the template is higher than that between the first group of image frames and the template.

In some embodiments, converting, based on a sample frame in a first video having a first resolution as well as a template, a first group of image frames in the first video that correspond to the sample frame to a second group of image frames includes: determining a mapping model based on the sampled frame and the template; and converting the first group of image frames to the second group of image frames using the mapping model.

In some embodiments, determining the mapping model based on a sample frame in the first video having the first resolution as well as the template includes: determining the mapping model based on a comparison between characteristics of the sample frame and characteristics of the template.

At block 620, the video processing device 120 converts the second group of image frames having the first resolution to a third group of image frames having a second resolution to generate a second video having the second resolution, wherein the second resolution is higher than the first resolution.

In some embodiments, converting the second group of image frames having the first resolution to a third group of image frames having a second resolution includes: converting the second group of image frames having the first resolution to the third group of image frames having the second resolution using an image conversion model associated with the template.

At block 630, video processing device 120 generates a second video having the second resolution based on the third group of image frames.

In some embodiments, method 600 further includes: converting the third group of image frames having the second resolution to a fourth group of image frames having the second resolution using a reverse mapping model corresponding to the mapping model.

In some embodiments, method 600 further includes: updating, if it is determined that the similarity between at least one image frame in the second group of image frames and the template is below a threshold, the mapping model based on another sample frame corresponding to the first group of image frames and the template for use in updating the at least one image frame in the second group of image frames.

In some embodiments, method 600 further includes: selecting the template among a plurality of templates based on the sample frame, each of the plurality of templates being associated with a corresponding image conversion model.

In some embodiments, method 600 further includes: identifying the first group of image frames among a plurality of image frames of the first video based on characteristics of the image frames.

In some embodiments, the image conversion model associated with the template is trained based on a training data set, the training data set including training frames of the first resolution and training frames of the second resolution that have similar characteristics to the template.

In some embodiments, the characteristics include at least one of the following: the brightness, the color distribution, a scene in an image frame, and the posture of an object in the image frame.

The foregoing describes example embodiments of the present disclosure with reference to FIG. 1 to FIG. 6. Embodiments of the present disclosure can achieve many advantages over conventional solutions, for example, before utilizing an image conversion model that is used for reconstructing a high-resolution video, low-resolution image frames are first converted to image frames more suitable for that image conversion model, and in this way, the quality of the reconstructed high-resolution video can be improved.

Figure 7:
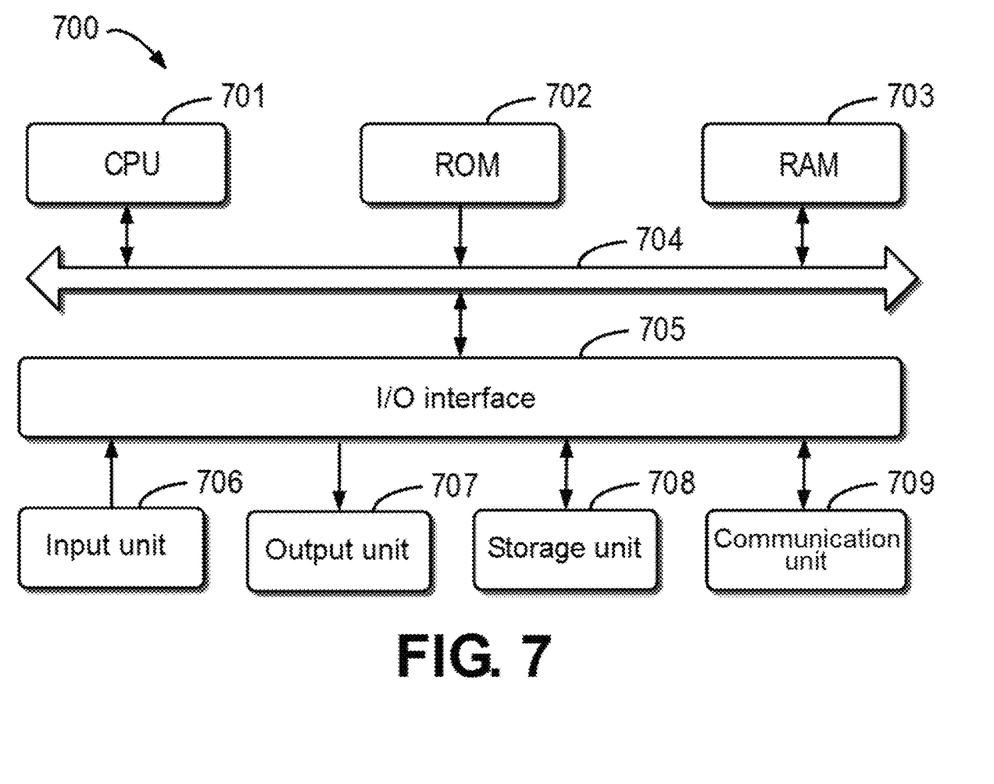
FIG. 7 illustrates a block diagram of an example device that may be used to implement embodiments of the present disclosure.

FIG. 7 illustrates a schematic block diagram of example device 700 that may be used to implement embodiments of the present disclosure. For example, video processing device 120 as shown in FIG. 1 may be implemented by device 700. As shown FIG. 7, device 700 includes central processing unit (CPU) 701, which may execute various appropriate actions and processing in accordance with computer program instructions stored in read-only memory (ROM) 702 or computer program instructions loaded from storage unit 708 onto random access memory (RAM) 703. Various programs and data required for the operation of device 700 may also be stored in RAM 703. CPU 701, ROM 702, and RAM 703 are connected to each other through bus 704. Input/Output (I/O) interface 705 is also connected to bus 704.

A plurality of components in device 700 are connected to I/O interface 705, including: input unit 706, such as a keyboard and a mouse; output unit 707, such as various types of displays and speakers; storage unit 708, such as a magnetic disk and an optical disc, and communication unit 709, such as a network card, a modem, and a wireless communication transceiver. Communication unit 709 allows device 700 to exchange information/data with other devices via a computer network, such as the Internet, and/or various telecommunication networks.

The various processes and processing described above, such as method 600, may be performed by CPU 701. For example, in some embodiments, method 600 may be implemented as a computer software program that is tangibly included in a machine-readable medium, such as storage unit 708. In some embodiments, part or all of the computer program may be loaded and/or installed onto device 700 via ROM 702 and/or communication unit 709. One or more actions of method 600 described above may be performed when the computer program is loaded into RAM 703 and executed by CPU 701.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented by using a combination of special hardware and computer instructions.

Illustrative embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms used herein is intended to best explain the principles and practical applications of the various embodiments and their associated improvements, so as to enable persons of ordinary skill in the art to understand the embodiments disclosed herein.

What is claimed is:

1. A method for video processing, comprising:
   converting, based on a sample frame in a first video having a first resolution as well as a template, a first group of image frames in the first video that correspond to the sample frame to a second group of image frames, wherein the similarity between the second group of image frames and the template is higher than that between the first group of image frames and the template;
   converting the second group of image frames having the first resolution to a third group of image frames having a second resolution, wherein the second resolution is higher than the first resolution; and
   generating a second video having the second resolution based on the third group of image frames;
   wherein converting the second group of image frames having the first resolution to a third group of image frames having a second resolution comprises:
   converting the second group of image frames having the first resolution to the third group of image frames having the second resolution using an image conversion model associated with the template.

2. The method according to claim 1, wherein converting, based on a sample frame in a first video having a first resolution as well as a template, a first group of image frames in the first video that correspond to the sample frame to a second group of image frames comprises:
   determining a mapping model based on the sample frame and the template; and
   converting the first group of image frames to the second group of image frames using the mapping model.

3. The method according to claim 2, further comprising:
   converting the third group of image frames having the second resolution to a fourth group of image frames having the second resolution using a reverse mapping model corresponding to the mapping model.

4. The method according to claim 2, further comprising:
   updating, if determining that the similarity between at least one image frame in the second group of image frames and the template is below a threshold, the mapping model based on another sample frame corresponding to the first group of image frames and the template for use in updating the at least one image frame in the second group of image frames.

5. The method according to claim 2, wherein determining a mapping model based on the sample frame and the template comprises:
   determining the mapping model based on a comparison between characteristics of the sample frame and characteristics of the template.

6. The method according to claim 5, wherein the characteristics comprise at least one of the following:
   brightness, color distribution, a scene in an image frame, and a posture of an object in the image frame.

7. The method according to claim 1, further comprising:
   selecting the template from a plurality of templates based on the sample frame, each of the plurality of templates being associated with a corresponding one of a plurality of image conversion models.

8. The method according to claim 1, wherein the image conversion model associated with the template is trained based on a training data set, the training data set comprising training frames of the first resolution and training frames of the second resolution that have similar characteristics to the template.

9. The method according to claim 1, further comprising:
   identifying the first group of image frames among a plurality of image frames of the first video based on characteristics of the image frames.

10. An electronic device, comprising:
    at least one processor; and
    memory coupled to the at least one processor, wherein the memory has instructions stored therein which, when executed by the at least one processor, cause the electronic device to perform actions comprising:
    converting, based on a sample frame in a first video having a first resolution as well as a template, a first group of image frames in the first video that correspond to the sample frame to a second group of image frames, wherein the similarity between the second group of image frames and the template is higher than that between the first group of image frames and the template;
    converting the second group of image frames having the first resolution to a third group of image frames having a second resolution, wherein the second resolution is higher than the first resolution; and
    generating a second video having the second resolution based on the third group of image frames;
    wherein converting the second group of image frames having the first resolution to a third group of image frames having a second resolution comprises:
    converting the second group of image frames having the first resolution to the third group of image frames having the second resolution using an image conversion model associated with the template.

11. The electronic device according to claim 10, wherein converting, based on a sample frame in a first video having a first resolution as well as a template, a first group of image frames in the first video that correspond to the sample frame to a second group of image frames comprises:
    determining a mapping model based on the sample frame and the template; and
    converting the first group of image frames to the second group of image frames using the mapping model.

12. The electronic device according to claim 11, wherein the actions further comprise:

converting the third group of image frames having the second resolution to a fourth group of image frames having the second resolution using a reverse mapping model corresponding to the mapping model.

13. The electronic device according to claim 11, wherein the actions further comprise:
    updating, if determining that the similarity between at least one image frame in the second group of image frames and the template is below a threshold, the mapping model based on another sample frame corresponding to the first group of image frames and the template for use in updating the at least one image frame in the second group of image frames.

14. The electronic device according to claim 11, wherein determining a mapping model based on the sample frame and the template comprises:
    determining the mapping model based on a comparison between characteristics of the sample frame and characteristics of the template.

15. The electronic device according to claim 14, wherein the characteristics comprise at least one of the following:
    brightness, color distribution, a scene in an image frame, and a posture of an object in the image frame.

16. The electronic device according to claim 10, wherein the actions further comprise:
    selecting the template from a plurality of templates based on the sample frame, each of the plurality of templates being associated with a corresponding one of a plurality of image conversion models.

17. The electronic device according to claim 10, wherein the image conversion model associated with the template is trained based on a training data set, the training data set comprising training frames of the first resolution and training frames of the second resolution that have similar characteristics to the template.

18. A computer program product tangibly stored on a non-transitory computer-readable medium and comprising machine-executable instructions, wherein the machine-executable instructions, when executed by a machine, cause the machine to perform actions comprising:
    converting, based on a sample frame in a first video having a first resolution as well as a template, a first group of image frames in the first video that correspond to the sample frame to a second group of image frames, wherein the similarity between the second group of image frames and the template is higher than that between the first group of image frames and the template;
    converting the second group of image frames having the first resolution to a third group of image frames having a second resolution, wherein the second resolution is higher than the first resolution; and
    generating a second video having the second resolution based on the third group of image frames;
    wherein converting the second group of image frames having the first resolution to a third group of image frames having a second resolution comprises:
    converting the second group of image frames having the first resolution to the third group of image frames having the second resolution using an image conversion model associated with the template.

19. The computer program product according to claim 18, wherein converting, based on a sample frame in a first video having a first resolution as well as a template, a first group of image frames in the first video that correspond to the sample frame to a second group of image frames comprises:

determining a mapping model based on the sample frame and the template; and converting the first group of image frames to the second group of image frames using the mapping model;

wherein the third group of image frames having the second resolution is converted to a fourth group of image frames having the second resolution using a reverse mapping model corresponding to the mapping model.

20. The computer program product according to claim 18, wherein the actions further comprise:

selecting the template from a plurality of templates based on the sample frame, each of the plurality of templates being associated with a corresponding one of a plurality of image conversion models.

* * * * *